United States Patent Office 3,310,696
Patented Mar. 21, 1967

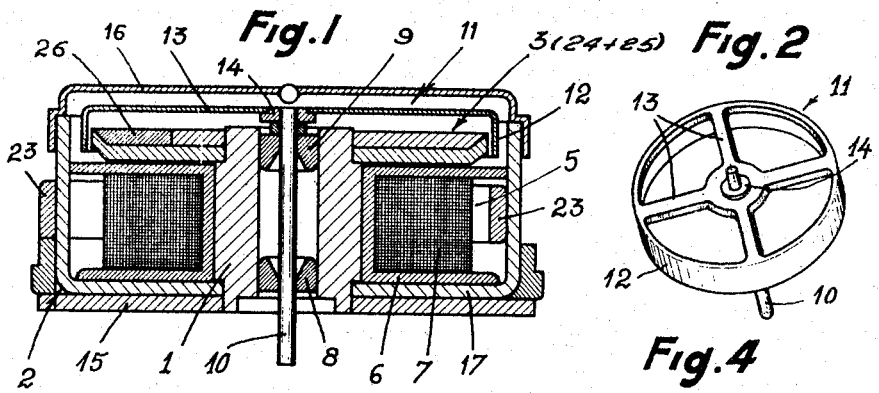
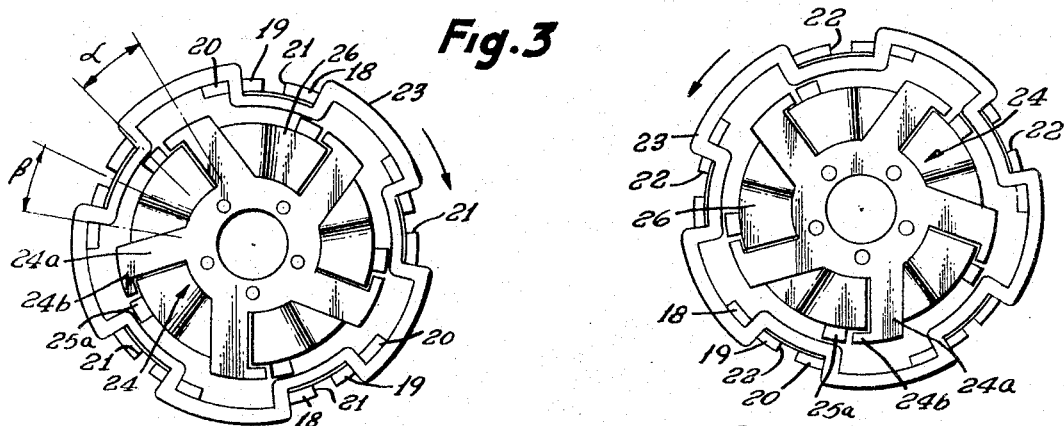
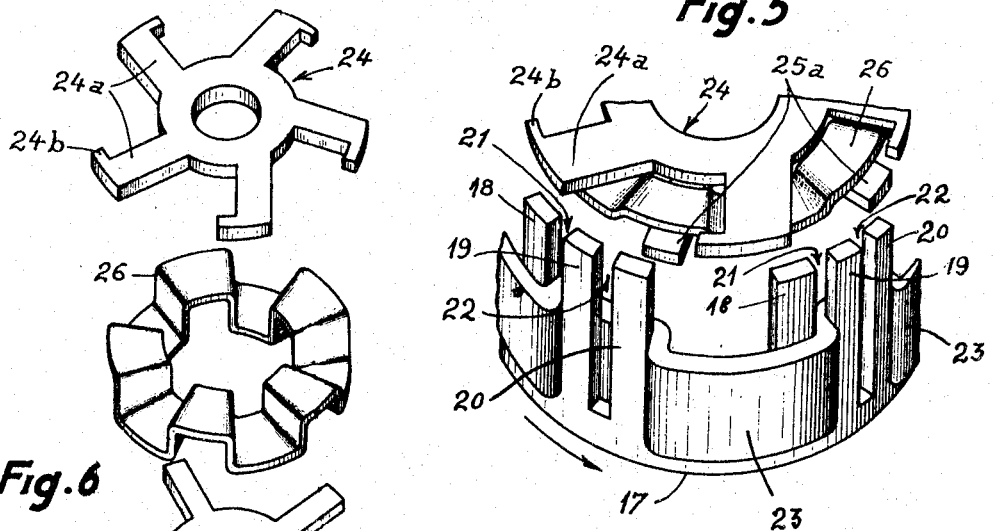
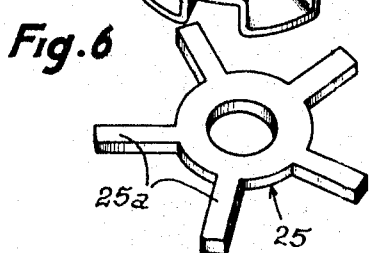

3,310,696
LOW-SPEED SYNCHRONOUS ELECTRIC MOTORS
Jean Jullien-Davin, Valence, France, assignor to Crouzet, Valence, France, a French company
Filed Jan. 28, 1964, Ser. No. 340,754
3 Claims. (Cl. 310—164)

The present invention relates to low-speed synchronous electric motors which are usually employed when relatively low useful power is required but the number of revolutions per unit of time of which is strictly dependent on the frequency of the main alternating current source, or network to which such motors are connected. It is essential to ensure that the operation of motors of the aforesaid type be absolutely reliable and that it is not necessary to make use of any source of power other than that of the main supply for the purpose of starting up said motors. These motors have come into general use in all applications involving the measurement of a time-interval.

The present invention applies to a particular type of motor wherein the stator comprises a stator element which is provided with radial pole-pieces the periphery of which is separated, from one extremity of the pole-pieces of another annularly disposed stator element, by an annular space in which the annular portion of a rotor is located.

The main object of the invention is to design a motor in which the direction of starting and of rotation depends only on the relative position which is given, at the time of assembly, to certain members constituting the stator elements of the motor, in particular on the angular position of a phase displacement ring which is associated with the pole-pieces of the annular portion of the stator and on the angular position of the radial members which constitute the radial element of said stator, one of said radial members being reversible in upside down relation to the other.

In accordance with the invention, the annular stator element comprises, coupled together at one end thereof so as to form a single-piece unit, sets of three teeth which are angularly spaced apart about the axis of the motor, the teeth of each set being separated from each other by two slots which are parallel to the aforesaid axis and in either one or the other of which (according to the desired direction of rotation of the shaft) is engaged a radial portion of the corresponding corrugation of a corrugated phase-displacement ring whose corrugations are equal in number to that of the sets of teeth, whilst the radial stator elements consists of two spiders placed together, said spiders having a number of arms which is equal to the number of sets of teeth and separated from each other by a corrugated phase-displacement ring which can be angularly displaced, the troughs of the corrugations of said ring being intended to accommodate the arms of said spiders which are capable of taking up two different angular positions, one of said spiders being reversible at will.

Each arm of the reversible spider terminates in a heel-shaped projection which is oriented circumferentially and which is intended, irrespective of the position of reversal of said spider, to come opposite the extremity of one of the arms of the other spider.

In a preferred form of embodiment, the base of the teeth forming the annular stator element forms one piece with a flange which is secured to one end of a tubular magnetic core, forming two spiders of the radial stator element being secured to the other end of said core.

The rotor, the shaft of which passes through the axial hole of the tubular core and is centered therein by bearings, advantageously consists of a ring made of a material able to temporarily gain alternate polarities and connected by arms to a hub which is secured to one end of the aforesaid shaft.

Further distintive particulars and characteristic features of the invention will be brought out by the description which follows below, reference being made therein to one embodiment of an improved synchronous motor of the hysteresis type in accordance with the invention, said example being given without implied limitation and illustrated diagrammatically in the accompanying drawings, in which:

FIG. 1 is a general view in axial cross-section of the motor;

FIG. 2 is a view in perspective of the rotor alone;

FIG. 3 is a plan view of a stator which is so arranged that the rotor unit of the motor rotates in a clockwise direction;

FIG. 4 is a view which is similar to the preceding, the positions of the members which constitute the stator being changed, however, so that the rotor unit of the motors rotates in the anticlockwise direction;

FIG. 5 is a partial view in perspective showing the manner in which the stator elements of the motor are mounted, in the case of the direction of rotation which is contemplated in FIG. 4;

FIG. 6 is an exploded view in perspective showing the members which constitute the radial stator element.

In the form of embodiment which is illustrated in the drawings, the motor comprises a tubular magnetic core 1 on the ends of which are fixed, by insetting for example, the two constituent elements 2 and 3 of the stator, the latter element being formed by two members 24 and 25. Between said elements the excitation coil 5 which consists of the frame 6 and the winding 7.

There are fitted, at the outlets of the axial bore of the magnetic core 1, the bearings 8 and 9 in which is rotatably mounted the driving shaft 10, at one end of which is fixed the rotor 11 which essentially consists of a ring 12 made of a material able to temporarily gain alternate polarities, said ring being coupled by arms 13 to a hub 14 which is made integral with the shaft 10.

The combined assembly is secured to a mounting plate 15 and enclosed within a protective body-casing 16.

The annular stator element 2 comprises a disc 17, the central portion of which is inset against a shouldered portion of the tubular core 1; the periphery of said disc terminates in a cylindrical ring-shaped portion made up of a number of sets, angularly spaced apart and separated from each other, of three teeth 18, 19, 20 which are separated from each other by slots 21 and 22 and which constitute pole-pieces arranged in parallel relation to the axis of the motor.

A cylindrical corrugated phase-displacement ring 23 (made of copper, for example) has radial portions which pass alternately from the interior to the exterior of the above-mentioned ring-shaped portion and conversely. Each alternate radial portion of the ring 23 passes, according to the desired direction of rotation of the shaft 10, either through the slots 21 or through the slots 22. In other words, the ring 23 can be placed at the time of assembly either in one or the other of two angular positions (as shown in FIGS. 3 and 4) relative to the stator element 2. Said ring 23 creates a phase lag over one portion of the parallel pole-pieces 18–19–20 when these latter are subjected to an alternating flux.

The two members forming the radial stator element 3 are two shaped members or spiders 24 or 25 having different shapes the central portions of which are inset against corresponding shouldered portions of the core 1. The arms 24a of the spider 24 form radial pole-pieces each terminating in a heel-shaped projection 24b which is oriented circumferentially towards a corresponding arm of the spider 25. The arms of the spider 24 are of greater width than the arms 25a of the spider 25, the purpose of this feature being to compensate the flux attenuation produced within said arms or pole-pieces 24a by means of a corrugated phase-displacement ring 26 which is interposed between the spiders considered and which can be placed at the time of assembly in either one or the other of two relative angular positions with respect to the members 24 and 25 of the stator element 3. At the time of assembly, said members 24 and 25 can also be made to occupy relatively to each other and with respect to the stator element 2 either one or the other of two different angular positions to which there correspond two inverted positions (obtained by turning upside down) of the spider 24.

In the relative position of the different stator elements as shown in FIG. 3, the rotor turns in the clockwise direction, whereas the rotor turns in the opposite direction in the case of the relative position which is shown in FIG. 4. In either case, the pole-pieces of the radial stator element 3 (associated members 24, 25) must be disposed angularly in an intermediate position (angular displacement through one-half the width of one pole-piece or one half pole-pitch) relatively to the pole-pieces of the annular stator element 2. The angles $\alpha$ and $\beta$ which define the spacing of the poles must in both cases (that is to say, in both directions of rotation) be identical in order that a rotating field can be produced. It is for this reason that, when the spiders 24 and 25 are inverted with respect to each other and the phase-displacement rings are displaced so as to change from the arrangement shown in FIG. 3 to that which is shown in FIG. 4 or conversely, the direction of rotation of the rotating field is correspondingly reversed.

It will be understood that the embodiment of the motor which has been described in the foregoing and illustrated in the accompanying drawings is given only by way of example and that any or all detail modifications can be made therein without consequently departing either from the scope or the spirit of the invention.

What I claim is:

1. In a low-speed synchronous electric motor having a stator formed of a radial magnetizable stator element and an annular magnetizable stator element which is separated from said radial stator element by an annular space, an excitation coil disposed between said two stator elements, a corrugated phase displacement ring for the said annular element, a shaft which is coaxial with said stator elements and a rotor fixed on said shaft and engaged within said annular space; said annular stator element comprising peripheral uniformly spaced sets of three teeth, the teeth of each set being separated from each other, so as to form individual pole-pieces, by two slots which are parallel to the said shaft and in one of which, according to the desired direction of rotation of the rotor, is engaged a radial portion of a corrugation of said ring whose corrugations are equal in number to the number of sets of teeth and which pass alternately on one side and on the other of said sets of teeth, said radial stator element comprising a first magnetizable star-shaped member having a number of arms which is equal to the number of sets of teeth, a second magnetizable star-shaped member which has the same number of arms as said first star-shaped member, which is contiguous with and coaxial with said first star-shaped member, which is disposed externally with respect to the coil and which is reversible in upside down relation to the other star-shaped member, and a phase-shift ring intercalated between the arms of the two star-shaped members and having transverse corrugations in each of which is fitted one of the star-member arms, the relative angular positions of said phase-shift ring and of said two star members being a function of the desired direction of rotation of the rotor.

2. Electric motor as claimed in claim 1, wherein the extremity of each arm of the external star member is provided with a circumferentially-oriented heel-shaped projection of which the free extremity is located opposite the extremity of one arm of the other star member without being in contact with said extremity.

3. Electric motor as claimed in claim 1, wherein the arms of the external star member have a cross-sectional area which is greater than that of the arms of the other star member.

References Cited by the Examiner

UNITED STATES PATENTS

| 2,256,711 | 9/1941 | Hansen et al. | 310—164 |
| 2,283,363 | 5/1942 | Hansen et al. | 310—164 |
| 2,323,036 | 6/1943 | Hansen et al. | 310—164 |
| 3,038,092 | 6/1962 | Bekey | 310—162 |

L. L. SMITH, *Assistant Examiner.*

MILTON O. HIRSHFIELD, *Primary Examiner.*

UNITED STATES PATENT OFFICE
CERTIFICATE OF CORRECTION

Patent No. 3,310,696                              March 21, 1967

Jean Jullien-Davin

It is hereby certified that error appears in the above numbered patent requiring correction and that the said Letters Patent should read as corrected below.

In the heading to the printed specification, between lines 5 and 6, insert -- Claims priority, application France, Jan. 29, 1963, PV 638/63 --.

Signed and sealed this 6th day of May 1969.

(SEAL)
Attest:

Edward M. Fletcher, Jr.

Attesting Officer

Commissioner of Patents